United States Patent
Yu

(10) Patent No.: US 7,779,753 B2
(45) Date of Patent: Aug. 24, 2010

(54) TEA BALL WITH STRING

(75) Inventor: Winnie Yu, Berkeley, CA (US)

(73) Assignee: Yaji, Inc., Berkeley, CA (US)

( * ) Notice: Subject to any disclaimer, the term of this patent is extended or adjusted under 35 U.S.C. 154(b) by 0 days.

(21) Appl. No.: 11/787,568

(22) Filed: Apr. 17, 2007

(65) Prior Publication Data

US 2007/0251394 A1 Nov. 1, 2007

Related U.S. Application Data

(60) Provisional application No. 60/795,346, filed on Apr. 27, 2006.

(51) Int. Cl.
*A23B 5/00* (2006.01)

(52) U.S. Cl. ....................................................... 99/495

(58) Field of Classification Search ........... 99/275–323, 99/495
See application file for complete search history.

(56) References Cited

U.S. PATENT DOCUMENTS

| 1,672,702 | A | * | 6/1928 | Weed | 219/86.1 |
| 1,723,702 | A | * | 8/1929 | Mitchell | 426/81 |
| 4,153,153 | A | * | 5/1979 | Herzog | 206/0.5 |
| 4,605,123 | A | * | 8/1986 | Goodrum et al. | 206/0.5 |

FOREIGN PATENT DOCUMENTS

EP 875467 A1 * 11/1998

* cited by examiner

*Primary Examiner*—Daniel Robinson
(74) *Attorney, Agent, or Firm*—H. Michael Brucker

(57) ABSTRACT

A tied tea ball equipped with a serving string by which the tea ball can be lowered into and removed from a vessel of water.

5 Claims, 2 Drawing Sheets

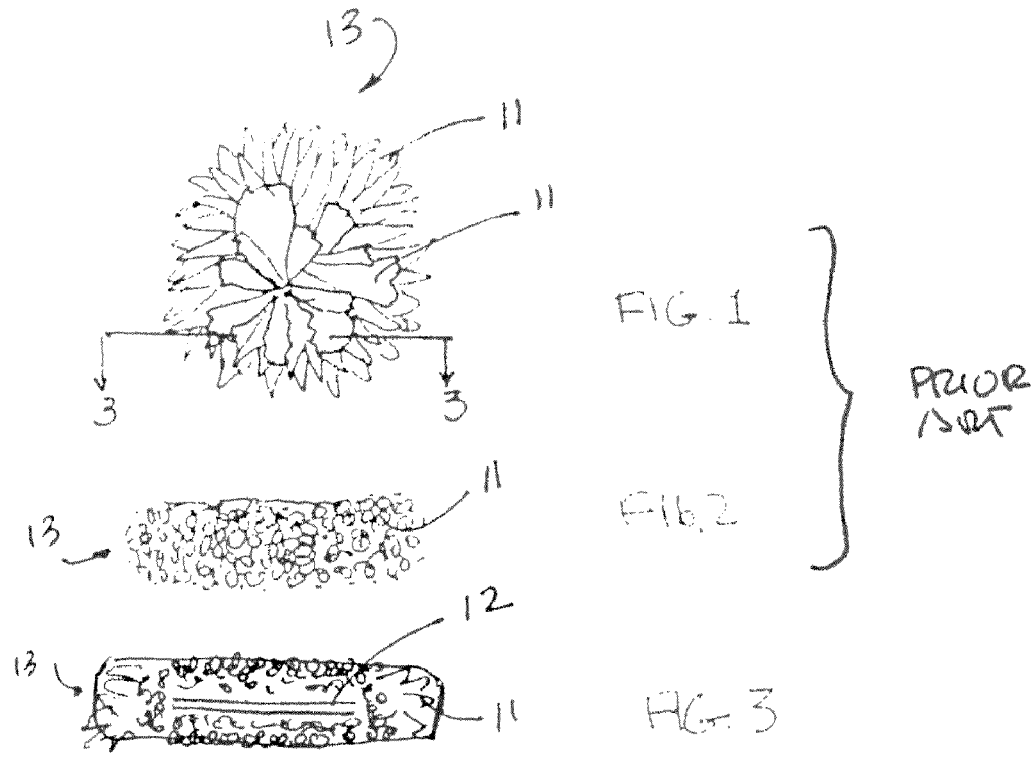
FIG. 1
FIG. 2
FIG. 3
PRIOR ART
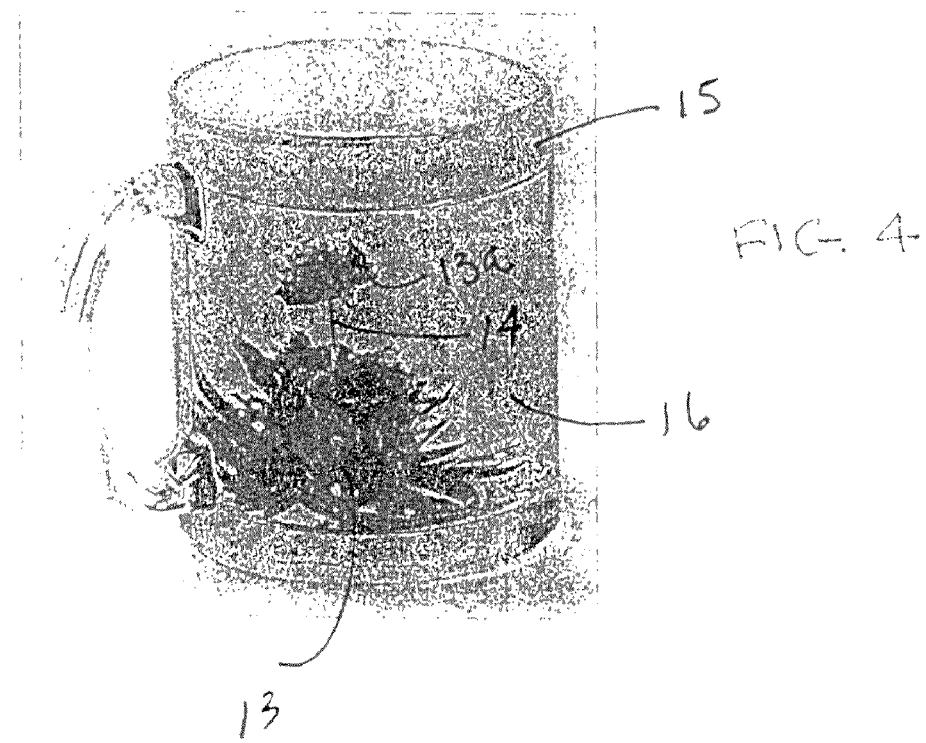
FIG. 4

TEA BALL WITH STRING

BACKGROUND OF THE INVENTION

The present invention relates to tea and, in particular, to a prepackaged serving of tea that is convenient to use.

Tied tea is a known form of tea in which generally whole leaves of tea are held (tied) together by a string and rolled to form a compact parcel of tea in any one of several different solid shapes, all of which are referred to here as a "tea ball" with the understanding that "tea balls" of the present invention are not necessarily spherical, but can be of any solid shape.

When put into a vessel of water (typically hot), these solid tea balls slowly sink to the bottom of the vessel as water is absorbed by the tea leaves. As the tea ball becomes infused with water, it gradually expands to several times its dry size and opens into a flower-like structure, releasing the tea flavor of the leaves.

The advantage of tied tea balls is that they are convenient to carry, are a pre-measured amount of tea and a delight to watch as they open into "flowers" of unexpected shapes and colors. Also, since they are not contained within a bag or similar container, the tea leaves are able to fully expand and expose most, if not all, of their surface area to the water.

While teas of various varieties have been used to make tied tea balls, and such tied tea balls open into "flowers" of many shapes, and some even include a brightly colored flower that is released from the ball when the ball fully opens, it has always been necessary to use some utensil to remove the tea ball from the water to either stop the tea from further brewing or to use the tea ball to brew a different cup or pot of water.

It is an object of the present invention to provide a more convenient tea ball.

BRIEF DESCRIPTION OF THE PRESENT INVENTION

The present invention improves tea balls by providing a convenient, always available, and inexpensive means by which the tea ball can be lowered into and removed from a cup or pot of water. The invention resides in a string attached to the tea ball.

The invention possesses other objects and advantages, especially as concerns particular characteristics and features thereof which will be better understood from the following detailed description of the preferred embodiments when read in conjunction with the appended drawing figures.

BRIEF DESCRIPTION OF THE DRAWINGS

FIG. 1 is a top view of a tea ball as known in the prior art;
FIG. 2 is a side view of the tea ball of FIG. 1;
FIG. 3 is a sectional view taken along the line 3-3 of FIG. 1;
FIG. 4 is a side perspective view of a prior art tea ball in a cup of water with the ball opened into a tea flower.

DETAILED DESCRIPTION OF THE INVENTION

Figure 5:
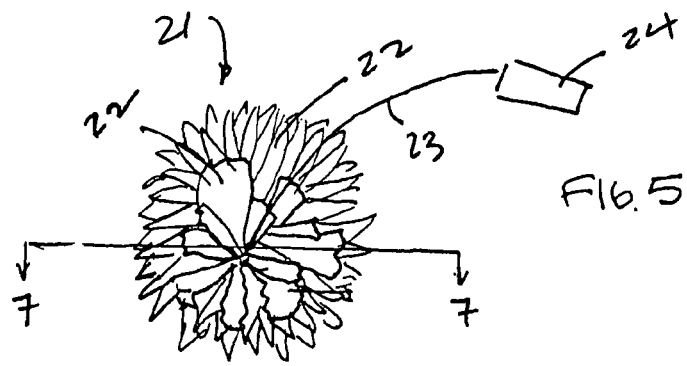
FIG. 5 is a top view of a tea ball of the present invention.

Referring to FIGS. 1-3, what is customarily referred to as "tied tea," includes a plurality of generally whole tea leaves 11 that are held together by a binding string 12 that directly contacts and encircles the leaves 11 and forms a tightly packed serving of tea 13 that is in a solid shape that can be of just about any geometry, but what is referred to here, regardless of the shape, as a "tea ball."

While there are a wide variety of tied tea products, some of which are rolled to form very dense, tightly packed servings of tea, they all share the common characteristics of being formed from generally whole leaves of tea held together by a string that is typically hand-tied.

When placed in a cup 15 of water 16, such as shown in FIG. 4, the tea ball 13 expands several times its dry size (the drawings are not to the same relative scale) and can include a separable flower 13a that is connected by a string 14 to the main body of the tea ball 13, but which floats above it in the cup of water.

One advantage of a tied tea ball is that it is made from generally whole leaves that are permitted to fully expand when hydrated and thus expose substantially all of the leaves to the water 16 so as to give it a rich tea flavor. The ability of the tea ball 13 to fully expand, as shown in FIG. 4, is partially due to the fact that it is not constrained within a bag or any other container.

Furthermore, the tied tea ball 13 has the advantage of being a measured amount of tea that can be easily carried about in a purse or the like and available for use when convenient. One of the disadvantages of tied tea is that once the tea fully expands in water, such as 16, it is necessary to use an instrument (spoon or the like) to remove the tea ball 13 from the water so as not to overbrew the tea or to use it for brewing a second cup of tea.

Figure 6:
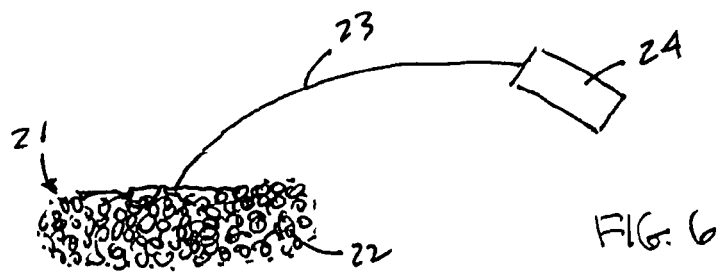
FIG. 6 is a side view of the tea ball of FIG. 5.
Figure 7:
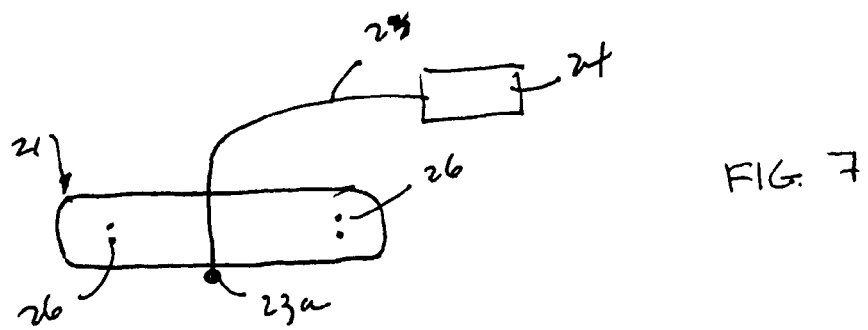
FIG. 7 is a sectional view taken along the line 7-7 of FIG. 5.

Referring to FIGS. 5-7, a tea ball 21 is formed from generally whole leaves 22 that are tied together as described in connection with FIGS. 1-3.

A serving string 23 is attached to the tied tea ball 21 and typically has a paper tab 24 secured at its end distal from the tea ball 21 whereby the string can be conveniently grasped. The string 23 and tab 24 provide a convenient means by which the tea ball 21 can be lowered into water to be brewed into tea and to remove the tea ball from the water when the brewing process has been completed. The string 23 and tab 24 are always present and eliminate the need for a separate utensil for removing the expanded tea ball 21 from a vessel of water.

Referring to FIG. 7, the serving string 23 passes through the tea ball 21, preferably near the center thereof, and is knotted at its end 23a in order to anchor the string 23 within the tea ball 21. The binding strings 26 that tie the leaves 22 together are separate from the serving string 23 which performs the functions described above.

Figure 8:
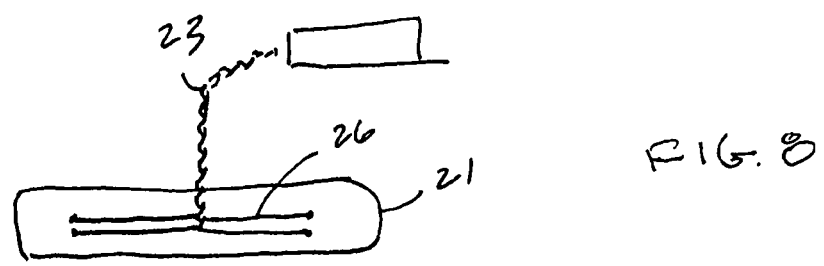
FIG. 8 is a sectional view similar to FIG. 7 of an alternative embodiment.

Referring to FIG. 8, in an alternative embodiment, the serving string 23 is a continuation of the binding strings 26 whereby the serving string 23 is firmly anchored within the tea ball 21.

From the forgoing, including the drawings, the invention is seen as comprising a plurality of generally whole tea leaves, a binding string that encircles and binds the tea leaves into a tea ball wherein the binding string is in direct contact with the tea leaves, a serving string having a length with a first end that is attached to the tea leaves of the tea ball and a second end that is free from and extends a distance away from the tea ball, whereby the tea ball can be lowered into and removed from a container of tea water by grasping the second end of the serving string and lowering or raising it as desired.

What is claimed is:

1. A tea serving comprising:
a plurality of generally whole tea leaves:
a binding string that encircles and binds tea leaves into a tea ball wherein said binding string is in direct contact with said tea leaves;
a serving string having a length with a first end that is attached to said tea leaves of said tea ball and a second end that is free from and can extend a distance away from said tea ball, whereby said tea ball can be lowered into and removed from a container of tea water by grasping the second end of said serving string and lowering or raising it as desired.

2. The tea serving of claim 1 wherein said serving string is an extension of said binding string.

3. The tea serving of claim 1 wherein said serving string and said binding string are two separate strings.

4. The tea serving of claim 2 wherein said serving string extends through at least a portion of said tea ball and beyond.

5. The tea serving of claim 1 wherein during use in water, said tea serving is not contained in a tea bag or other container whereby said whole tea leaves are free to expand and are visible in their expanded condition.

* * * * *